United States Patent
McQuade et al.

(10) Patent No.: US 9,607,464 B2
(45) Date of Patent: Mar. 28, 2017

(54) METHOD AND APPARATUS FOR FUEL ISLAND AUTHORIZATION FOR TRUCKING INDUSTRY USING PROXIMITY SENSORS

(71) Applicant: ZONAR SYSTEMS, INC., Seattle, WA (US)

(72) Inventors: Charles Michael McQuade, Issaquah, WA (US); Rick Fadler, Newcastle, WA (US); Ryan Schoelerman, Seattle, WA (US)

(73) Assignee: ZONAR SYSTEMS, INC., Seattle, WA (US)

( * ) Notice: Subject to any disclaimer, the term of this patent is extended or adjusted under 35 U.S.C. 154(b) by 0 days.

(21) Appl. No.: 14/203,135

(22) Filed: Mar. 10, 2014

(65) Prior Publication Data

US 2014/0263628 A1 Sep. 18, 2014

Related U.S. Application Data

(60) Provisional application No. 61/792,838, filed on Mar. 15, 2013.

(51) Int. Cl.

| | |
|---|---|
| *B67D 7/08* | (2010.01) |
| *B67D 7/04* | (2010.01) |
| *B67D 7/14* | (2010.01) |
| *G06Q 50/06* | (2012.01) |
| *G07F 7/12* | (2006.01) |
| *G07F 7/02* | (2006.01) |

(Continued)

(52) U.S. Cl.
CPC ............. *G07F 7/12* (2013.01); *B67D 7/0401* (2013.01); *B67D 7/08* (2013.01); *B67D 7/145* (2013.01); *G06Q 20/342* (2013.01); *G06Q 50/06* (2013.01); *G07F 7/025* (2013.01); *G07F 13/025* (2013.01); *B67D 2007/0457* (2013.01); *B67D 2007/0459* (2013.01)

(58) Field of Classification Search
CPC ...... B67D 7/145; B67D 7/348; B67D 7/0401; B67D 7/08; B67D 2007/0457; B67D 2007/0459; G06Q 50/06; G07B 15/063; G07F 13/025

See application file for complete search history.

(56) References Cited

U.S. PATENT DOCUMENTS

| | | | |
|---|---|---|---|
| 4,263,945 | A | 4/1981 | Van Ness |
| 4,469,149 | A | 9/1984 | Walkey et al. |
| 4,658,371 | A | 4/1987 | Walsh et al. |

(Continued)

*Primary Examiner* — Suezu Ellis

(57) ABSTRACT

A fuel authorization program based on equipping fuel station, fuel pumps, and vehicles with components to enable automatic fuel authorization for enrolled vehicles. The program includes fuel pumps including a pump transmitting sensor that automatically emits a pump ID. As a vehicle pulls in next to the pump a vehicle coupling receiving sensor detects the pump ID signal and a proximity link is created. The vehicle sensor passes the pump ID via hardwire or Bluetooth to vehicle fuel authorization processor (which can be part of a telematics device). The vehicle processor transmits the pump ID (and any fuel authorization credentials needed, such as a PIN or VIN) via WI-FI to a Station processor for fuel vendor authorization. If approved, the pump is enabled. As the vehicle moves away the coupling sensor link is broken and the vehicle transmits a "disconnect" message via Wi-Fi and the pump is disabled.

12 Claims, 6 Drawing Sheets

(51) Int. Cl.
   *G07F 13/02*     (2006.01)
   *G06Q 20/34*    (2012.01)

(56) References Cited

U.S. PATENT DOCUMENTS

| | | | |
|---|---|---|---|
| 4,846,233 A | 7/1989 | Fockens | |
| 4,934,419 A | 6/1990 | Lamont et al. | |
| 5,072,380 A | 12/1991 | Randelman et al. | |
| 5,204,819 A | 4/1993 | Ryan | |
| 5,359,522 A | 10/1994 | Ryan | |
| 5,440,109 A | 8/1995 | Hering et al. | |
| 5,596,501 A | 1/1997 | Comer et al. | |
| 5,890,520 A | 4/1999 | Johnson, Jr. | |
| 5,913,180 A | 6/1999 | Ryan | |
| 5,923,572 A * | 7/1999 | Pollock | 700/282 |
| 5,956,259 A * | 9/1999 | Hartsell et al. | 700/302 |
| 6,024,142 A | 2/2000 | Bates | |
| 6,070,156 A | 5/2000 | Hartsell, Jr. | |
| 6,085,805 A * | 7/2000 | Bates | B67D 7/145 141/192 |
| 6,128,551 A | 10/2000 | Davis et al. | |
| 6,169,938 B1 | 1/2001 | Hartsell, Jr. | |
| 6,616,036 B2 | 9/2003 | Streicher et al. | |
| 6,899,151 B1 | 5/2005 | Latka et al. | |
| 7,155,199 B2 | 12/2006 | Zalewski | |
| 7,604,169 B2 | 10/2009 | Demere | |
| 7,640,185 B1 | 12/2009 | Giordano et al. | |
| 2001/0034565 A1 * | 10/2001 | Leatherman | 700/232 |
| 2005/0010797 A1 | 1/2005 | Rushworth | |
| 2005/0018853 A1 | 1/2005 | Lain et al. | |
| 2009/0048945 A1 * | 2/2009 | DeLine | 705/27 |
| 2009/0255195 A1 | 10/2009 | Bridgman | |
| 2010/0088127 A1 | 4/2010 | Betancourt et al. | |
| 2010/0191674 A1 | 7/2010 | Condon | |
| 2010/0198491 A1 | 8/2010 | Mays | |
| 2011/0035049 A1 | 2/2011 | Barrett | |
| 2012/0095920 A1 * | 4/2012 | McQuade | H04L 9/3215 705/50 |
| 2012/0176499 A1 | 7/2012 | Winter | |
| 2012/0223829 A1 * | 9/2012 | Tyler | 340/450.2 |
| 2012/0303531 A1 * | 11/2012 | Betancourt | 705/44 |
| 2014/0263629 A1 * | 9/2014 | McQuade et al. | 235/381 |
| 2015/0242969 A1 * | 8/2015 | Pallas | G06Q 50/06 705/39 |

\* cited by examiner

METHOD AND APPARATUS FOR FUEL ISLAND AUTHORIZATION FOR TRUCKING INDUSTRY USING PROXIMITY SENSORS

RELATED APPLICATIONS

This application is based on a prior copending provisional application; Ser. No. 61/792,838, filed on Mar. 15, 2013, the benefit of the filing date of which is hereby claimed under 35 U.S.C. §119(e).

BACKGROUND

The trucking industry has an ongoing problem with fuel theft. Trucking companies normally issue fuel cards to drivers. The drivers purchase fuel for company trucks at national refueling chains (i.e., truck stops).

A large problem is that owner operators also frequent such refueling stations. Company drivers often make deals with owner operators to allow the owner operators use of a company fuel card for a cash payment. For example, the owner operator will give the company driver $50 in cash to purchase $150 of fuel on the company fuel card, saving the owner operator $100 in fuel costs. This type of fraud is very difficult for the fleet operators to detect and prevent, because the amount of diverted fuel may be sufficiently small relative to the miles that the fleet vehicle is driven by the driver so as to be difficult to notice, even when fuel use patterns of the vehicle are analyzed.

It would therefore be desirable to provide a more secure method and apparatus for implementing fuel authorization in the trucking industry that actually prevents owner operators from stealing fuel charged to a fleet operator account.

SUMMARY

The concepts disclosed herein are directed to a method to enable an operator of vehicle refueling stations to automatically authorize the refueling of a specific vehicle, such that once the authorization is provided, the fuel being dispensed cannot easily be diverted to a different vehicle. The method involves elements on the vehicle, elements on the fuel island, and a controller (such as a computing device) that receives data from the vehicle to use to determine whether or not to authorize fuel delivery. A short range transmitter (a Proximity Transmitter) is disposed on the fuel pump (or on the fuel island near a fuel pump) and broadcasts a Pump ID. In some embodiments, the Proximity Transmitter is always broadcasting if the pump is operational (i.e., the fueling station is open), while in other embodiments the proximity transmitter only transmits the Pump ID after a trigger has indicated a vehicle is nearby. Such a trigger can be a motion sensor deployed near the fuel pump or in the fuel lane, although as will be described in greater detail below other types of triggers can be employed. Each enrolled vehicle will be equipped with a corresponding short range receiver (a Proximity Receiver) mounted proximate the vehicle fuel tank, so that when the vehicle is positioned close enough to the fuel pump to receive fuel, the Proximity Receiver can acquire the Pump ID from the Proximity Transmitter. Once the Proximity Receiver obtains a Pump ID, the Proximity Receiver communicates the Pump ID to a Fuel Authorization Controller at the vehicle. The Fuel Authorization Controller uses a wireless data link (Wi-Fi in an exemplary but not limiting embodiment) to send a Fuel ID and the Pump ID to a Station Controller. The Station Controller checks the Fuel ID to determine if the fuel delivery is authorized. If so, the Station Controller enables fuel delivery at the fuel pump corresponding to the Pump ID.

In an exemplary embodiment, the nominal ranges of the Proximity Transmitter and the Proximity Receiver are relatively short (recognizing that the concepts disclosed herein encompass embodiments where the nominal range of only one of Proximity Transmitter and the Proximity Receiver is controlled to be relatively short). In at least one embodiment, the nominal range is within 15% of 50 feet. In at least one embodiment, the nominal range is within 15% of 25 feet. In at least one embodiment, the nominal range is within 15% of 10 feet. In at least one embodiment, the nominal range is within 15% of 5 feet. In addition to (or in place of) controlling the nominal range of the Proximity Transmitter and the Proximity Receiver, the directionality of the Proximity Transmitter and the Proximity Receiver can be controlled to provide a directional transmission or reception (recognizing that the concepts disclosed herein encompass embodiments where the directionality of only one of Proximity Transmitter and the Proximity Receiver the is controlled). The directionality of RF signals can be controlled using shielding (shielding and low power combine work best, as the low power reduces the likelihood of reflections broadening the directionality). Optical data transmission is highly directional. RFID readers and tags are readily controlled to achieve a desired nominal distance. In general, RF based Pump ID transmission will offer the benefit of not suffering from interference with dirt/grime that can coat optical transmitters or receivers.

In an exemplary but not limiting embodiment, the Fuel ID is a vehicle identification number (VIN) obtained from a vehicle data bus or non-removable vehicle memory. Using a VIN that must be obtained from a vehicle data base (or vehicle memory that is relatively difficult to remove from the vehicle) will make it harder for the fuel authorization to be spoofed by moving hardware components from authorized vehicles to non-authorized vehicles, or by simply storing an approved Fuel ID in a device in a non-authorized vehicle. In such embodiments, the Fuel Authorization Controller is logically coupled to the Proximity Receiver and the vehicle data bus/memory where the VIN can be retrieved.

In another exemplary but not limiting embodiment, the Fuel ID is a PIN number input into a computing device at the vehicle by a driver. In some embodiments, the driver is promoted to input such a PIN when the Pump ID is received. The PIN prevents drivers from using an approved PIN in a non-approved vehicle, because the non-approved vehicle is not likely to have the Proximity Receiver required to obtain the Pump ID, and without the Pump ID and the Fuel ID fuel authorization will not be approved. In such embodiments, the Fuel Authorization Controller is logically coupled to the Proximity Receiver and the input device used by the driver (and in some embodiments the input device and the Fuel Authorization Controller are implemented using a single computing device, such as a tablet or mobile computing device).

In another exemplary but not limiting embodiment, the Station Controller consults a remote authorization database via a network connection to determine if the Fuel ID is authorized (such authorization can be denied in the event of poor payment history, an expired Fuel ID, or other reasons).

In another exemplary but not limiting embodiment, the Station Controller is logically coupled to a Pump Controller that enables fuel delivery at the corresponding fuel pump.

In an exemplary but not limiting embodiment, the Station Controller generates a data record defining the quantity of fuel delivered, and the record can also include the date, time, and location of the refueling.

In an exemplary but not limiting embodiment, if a motion detector detects that the vehicle has exited the fuel island after the fuel dispenser is enabled but before the fuel is dispensed, the authorization is canceled to prevent the fuel from being dispensed to a non-authorized vehicle. Sensors can include weight sensors, and motion sensors. Some motion sensors detect changes in temperature, while other motion sensors are based on detecting a change in a distance between the sensor and a reflective surface (ultrasonic sensors can be used for this function). The latter type of motion sensors are sometimes referred to as range finders.

In an exemplary but not limiting embodiment, the data link between the Fuel Authorization Controller at the vehicle and the Station Controller is maintained as long as the link between the Proximity Transmitter and the Proximity Receiver exists. In such an embodiment, once the data link between the Fuel Authorization Controller at the vehicle and the Station Controller is terminated, the pump is disabled (the authorization is canceled) to prevent the fuel from being dispensed to a non-authorized vehicle after the authorized vehicle moves away from the pump.

Significantly, the disclosed fuel authorization technique is resistant to spoofing by simply moving a component including the Fuel Authorization Processor that was added to each enrolled vehicle to enable the vehicle to participate in the fuel authorization program and installing that component on a non-authorized vehicle, because the added component does not itself store all the data required to enable fuel authorization. Instead, the component is configured to retrieve some of the required data from a vehicle memory that is not part of the component. Since the non-authorized vehicle will not include the memory storing the required data, simply moving the component to a different vehicle will be insufficient to enable the different vehicle to participate in the fuel authorization program. In some exemplary embodiments, the required information that is stored in the memory and not in the component is a vehicle ID number, such as VIN # (i.e., a vehicle identification number). In some exemplary embodiments, the required information is a password or PIN. In other exemplary embodiments, the required information includes both a vehicle ID number or PIN and the Pump ID. The term not readily removable is intended to refer to memory that requires a significant amount of effort to remove from the vehicle. This aspect of the concepts disclosed herein is intended to deter drivers from attempting to temporarily remove a component used in the fuel authorization program and lend that component to another vehicle, to enable a non-authorized vehicle to receive fuel using the fuel authorization program. For example, some fuel authorization programs attempted to deploy radiofrequency (RFID) tags on enrolled vehicles, such that when an RFID tag reader at a fuel pump read an enrolled RFID tag, the pump was enabled. Such a fuel authorization program is easily circumvented by drivers who would temporarily remove the RFID tag (which was generally attached to the windshield of the vehicle) and loan the RFID tag to a non-participating vehicle. By including some data component required to complete the fuel authorization process in a memory that is not readily removable from the vehicle, it will be much more difficult for drivers to circumvent the fuel authorization program. In an exemplary embodiment, the required data is stored in a memory that requires an hour or more of time to remove from the vehicle.

In at least one exemplary embodiment, during the RF communication between Fuel Authorization Controller and the Station Controller, data from the vehicle (including but not limited to accumulated mileage, accumulated engine hours, and in some embodiments, a quantity of fuel present in the vehicle's fuel tanks) are transferred from the vehicle to the fuel vendor over the wireless data link. That data can then be used to audit the vehicle's fuel usage, and to detect fuel fraud that could occur if a driver allows authorized fuel to be siphoned or otherwise removed from the vehicle, rather than be consumed by that vehicle. Additional data, not related to the fuel authorization program, can also be conveyed over the wireless data link between the vehicle and the fuel vendor, if desired.

In other exemplary embodiments discussed below, the Proximity Transmitter is enabled only when an enrolled vehicle (a vehicle equipped with a Fuel Authorization Controller) is able to establish a wireless data link with the Station Controller.

Other aspects of the concepts disclosed herein are directed to a memory medium that stores machine instructions, which when executed by a processor, carries out substantially the same functions described above, and by a system. In such systems, the basic elements include an enrolled vehicle having two different data link components (a Proximity Receiver and a wireless data link component to couple the Fuel Authorization Controller with the Station Controller), the Proximity Transmitter/Proximity Receiver data link being highly directional and/or short ranged, a computing device programmed to automatically determine if a specific enrolled vehicle is authorized to be refueled, and a fuel island that includes a Proximity Transmitter (and optionally a motion sensor for detecting the presence of a vehicle in a specific refuel lane).

The above noted methods are preferably implemented by at least one processor (such as a computing device implementing machine instructions to implement the specific functions noted above) or a custom circuit (such as an application specific integrated circuit).

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1A schematically illustrates a fuel authorization paradigm in accord with the concepts disclosed herein that relies on a relatively short range data link (a proximity data link) between a fuel pump and an enrolled vehicle, and a relatively longer range data link between the enrolled vehicle and a station fuel authorization controller;

FIG. 1B is a logic diagram showing exemplary overall method steps implemented in a first exemplary embodiment for implementing a fuel authorization method;

FIG. 2 schematically illustrates vehicle components and fuel island components used to implement the method steps of FIG. 1;

Figure 5:
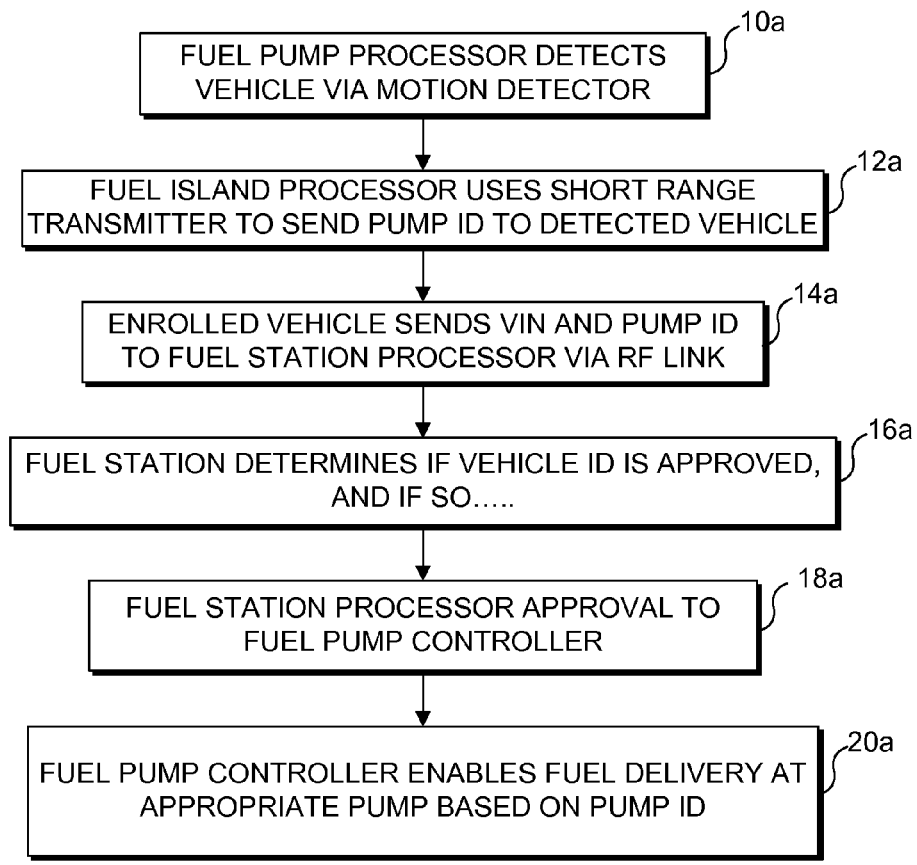
FIG. 5 is a logic diagram showing exemplary overall method steps implemented in a second exemplary embodiment for implementing a fuel authorization method.
Figure 6:
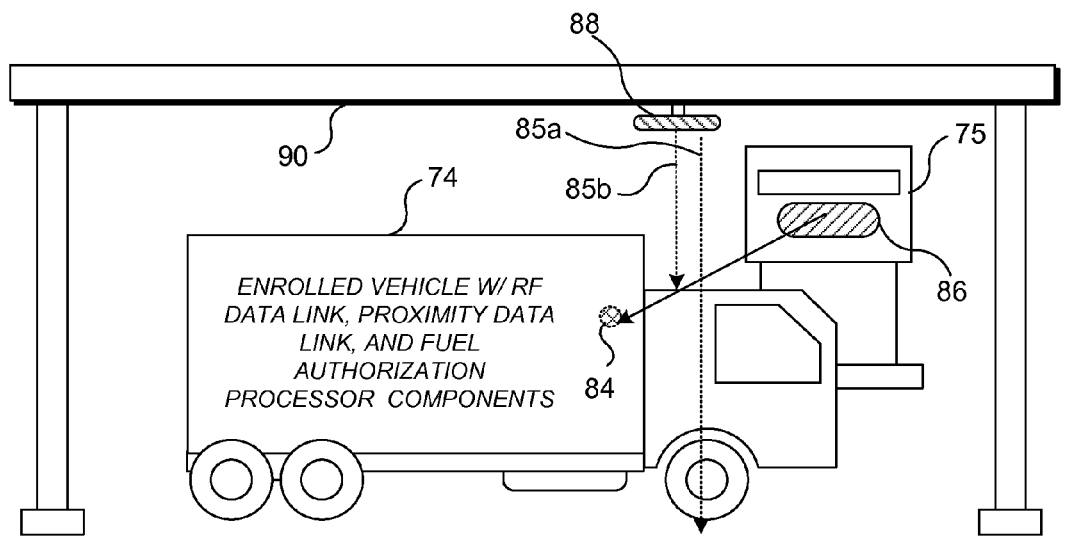
Figure 7:
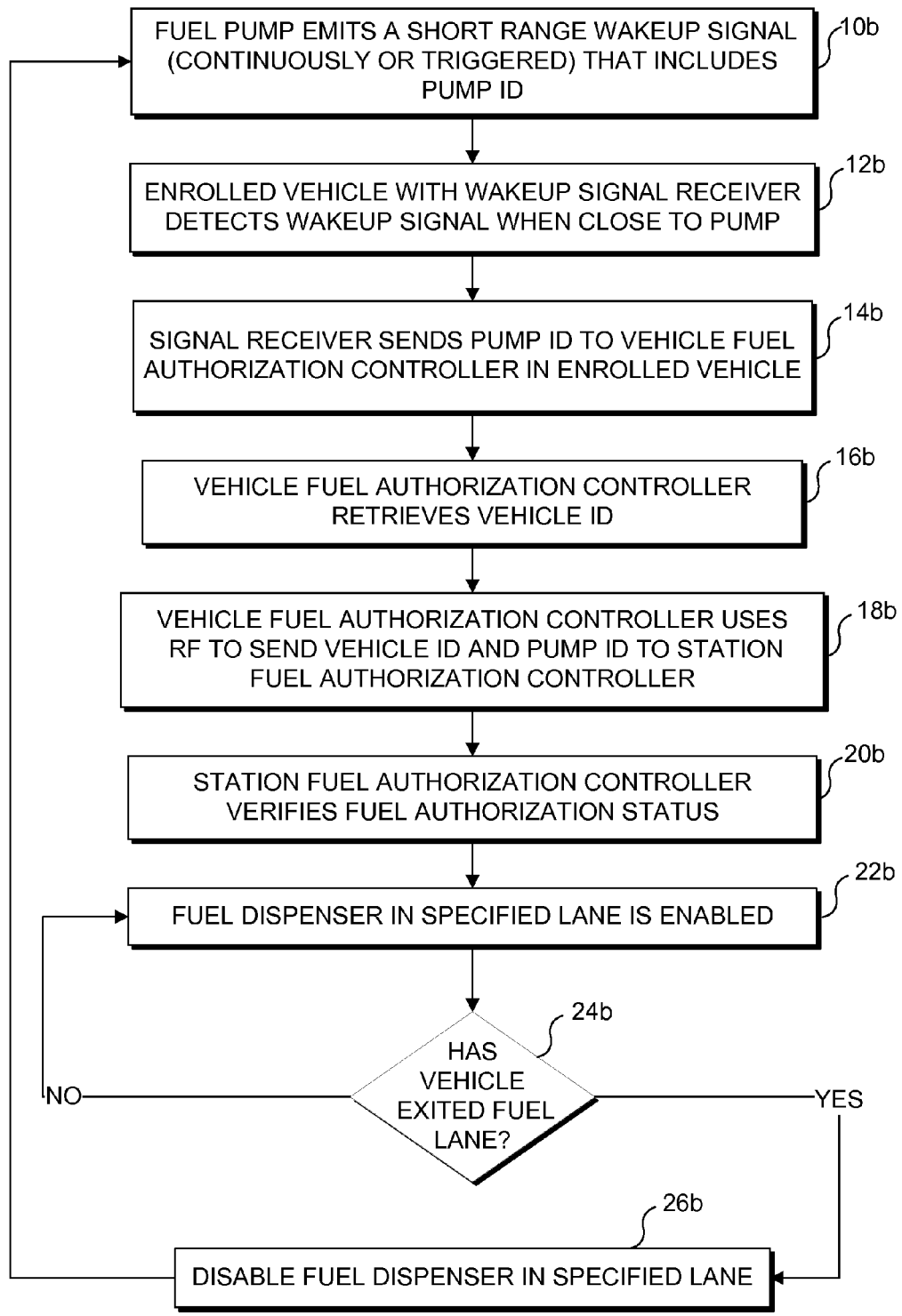
Figure 8:
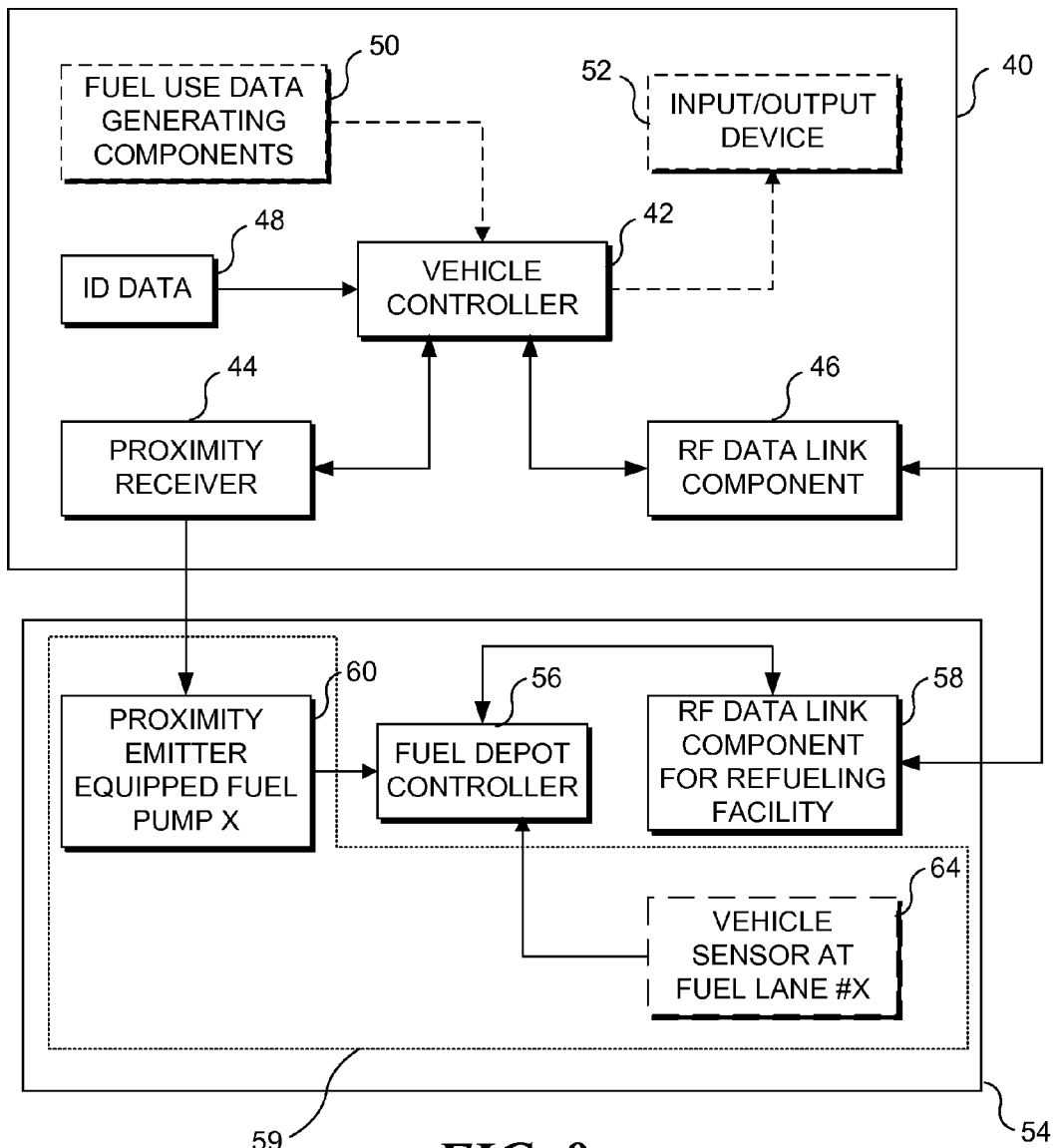
Figure 9:
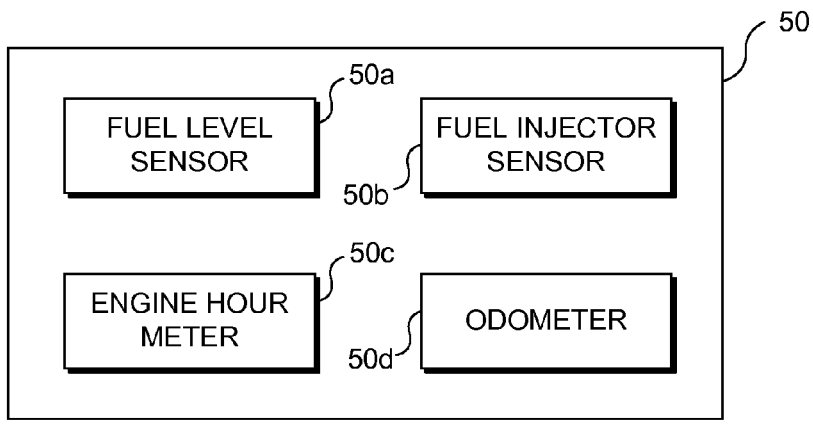

FIG. 6 schematically illustrates vehicle components and fuel island components used to implement the method steps of FIG. 5;

FIG. 7 is a logic diagram showing exemplary overall method steps implemented in a third exemplary embodiment for implementing a fuel authorization method;

FIG. 8 is an exemplary functional block diagram showing the basic functional components used to implement a system consistent with one or more of the methods disclosed herein; and FIG. 9 is an exemplary functional block diagram showing some of the basic functional components used to collect fuel use data from a vehicle.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

This specification discloses multiple embodiments of a fuel authorization system that employs proximity sensors. This system uses a proximity sensing receiver mounted in a vehicle near the fuel filler and a Wakeup Transmitting device mounted on the fuel dispenser. When the proximity sensing receiver on the vehicle moves within a short distance of the transmitting device on the fuel dispenser they exchange information. That information is then used to make a data connection using some other mechanism (cellular, Wi-Fi, private radio, etc.) where vehicle/driver information can be passed to a server which can authorize/enable the distribution of fuel.

Figure 1A:
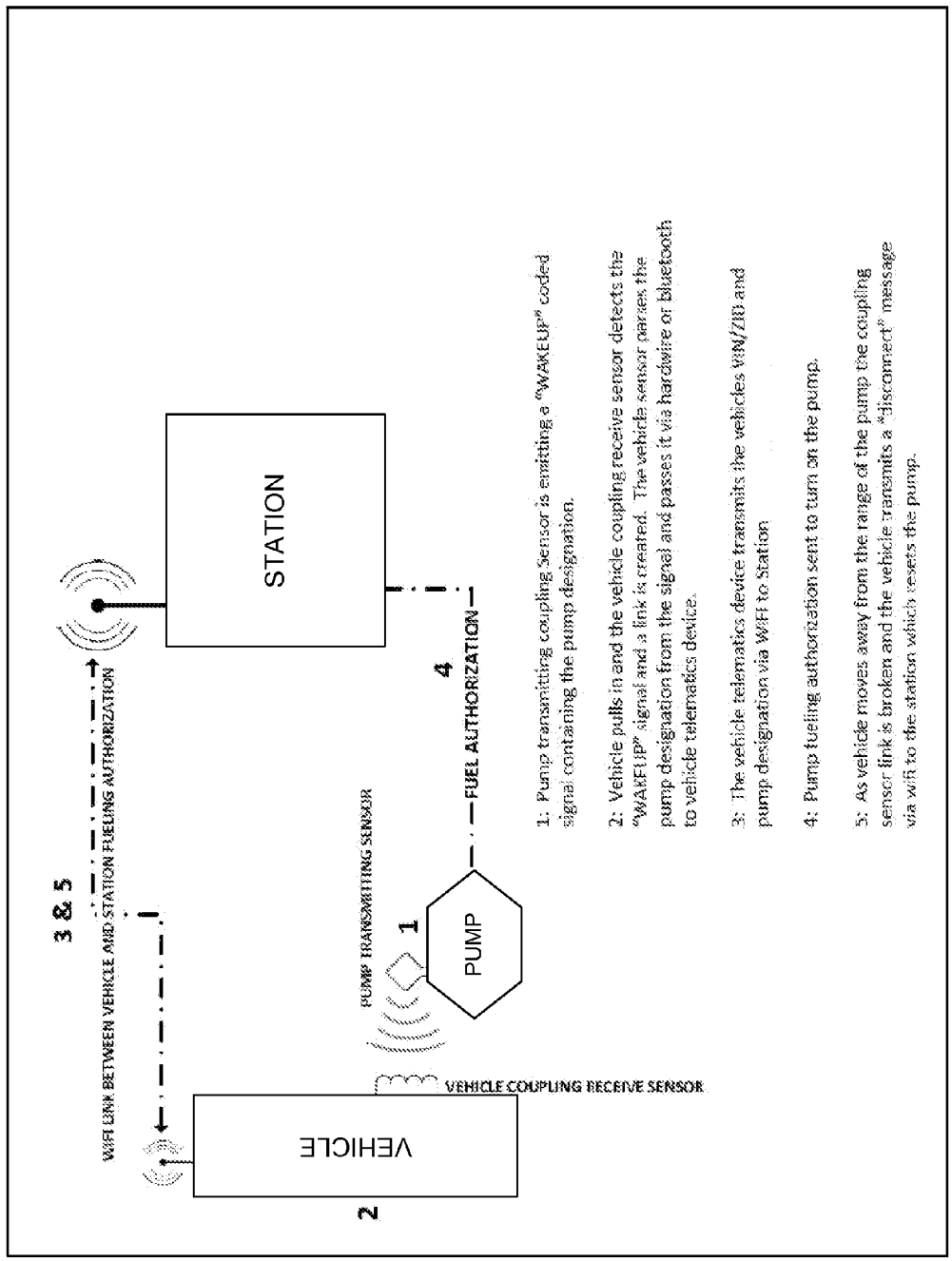

FIG. 1A and the text below provide an overview of a fuel authorization system that employs proximity sensors. Referring to FIG. 1A:

1: Pump transmitting coupling Sensor is emitting a "WAKEUP" coded signal containing the pump designation.

2: Vehicle pulls in and the vehicle coupling receive sensor detects the "WAKEUP" signal and a link is created. The vehicle sensor parses the pump designation from the signal and passes it via hardwire or Bluetooth to vehicle telematics device.

3: The vehicle telematics device transmits the vehicles VIN/ZID (ZID being a unique ID based on the VIN and other data, which may include a S/N of a telematics device installed in the vehicle) and pump designation via WIFI to Station for fuel vendor authorization.

4: Pump fueling authorization sent to turn on the pump.

5: As vehicle moves away from the range of the pump the coupling sensor link is broken and the vehicle transmits a "disconnect" message via Wi-Fi to the station which resets the pump.

In at least one series of embodiments, the sensor(s) on the fuel pump and vehicle are just a single chip, and are not configured to pass that much data (i.e., they can only exchange serial numbers). In such embodiments the system also includes a higher bandwidth data link, such as Wi-Fi or RF. In at least one embodiment, no data is sent from the vehicle to the fuel pump over the proximity sensor, just data (the Pump ID) from the fuel pump to the vehicle.

In at least some embodiments, the pump controller is the endpoint of what the vehicle equipment talks to.

When the proximity sensors on the pump/vehicle get near each other they communicate. One is a low-power one (listening, preferably on the vehicle), the other is a relatively high-power one that is always transmitting (or is triggered as discussed below). High-power is a relative term, the Wake Up signal from the fuel pump need not travel beyond the boundaries of the fuel station, and in at least some embodiments attempts have been made to minimize Wake Up signal propagation to other fuel lanes (via shielding, directional control, and/or power control).

Detailed Description of Components of FIG. 1A

There are multiple components utilized in this solution;

Fuel Dispenser Mounted Wakeup Transmitter—This component is mounted on a fuel dispenser (fuel pump) near where the nozzle is stored.

Fuel Dispenser-Based Data Interface—This component allows for direct communication between the vehicle and the fuel pump controller. This component is optional, and not needed where a Wi-Fi or RF data link between the vehicle and station controller is established.

Vehicle Mounted Proximity Sensing Receiver—This component is mounted near the fuel filler point on the vehicle.

Vehicle Data Bus Interface—This component is used to interface to the vehicles data bus to obtain a VIN from a non-removable memory in the vehicle (this makes the system harder to spoof by moving components from an authorized vehicle to an unauthorized vehicle). Its mounting position will vary depending on the vehicle.

Vehicle-Based Data Interface—This component is used to communicate the vehicle and potentially the driver/operator information to the system which authorizes the fuel to be dispensed. This component can be a dedicated device or a general purpose device such as a tablet or cell phone depending on how the solution is implemented at the fuel pump.

Use Cases:

Generic Use Case: Vehicle arrives at a fuel pump, the proximity sensing transmitter is emitting a 'Wakeup' signal that will be detected by a vehicle that is close enough to the fuel pump. This close proximity will activate the authorization system.

The vehicle sensing receiver detects the 'Wakeup' signal and receives from the fuel pump proximity sensing transmitter an ID that it combines with the vehicle VIN pulled from the ECU, potentially the driver's ID, as well as other optional data such as engine hours, fuel tank level, position data (latitude/longitude), etc., and sends that information to the fuel authorization system.

The fuel authorization system evaluates the information it has received from the vehicle and either authorizes the pump to dispense fuel or denies the request and sends the denial information back to the driver/operator.

As the vehicle pulls away from the pump the proximity detecting receiver on the vehicle detects that it has left the range of pump transmitting the wakeup signal. The vehicle sends a message to the fuel authorization system indicating the vehicle has departed. Upon receiving the information that the vehicle has departed the fuel authorization system will disable the fuel pump.

Fuel Station/Terminal Using Dedicated Wireless Installation

Components:

Each pump has a proximity transmitting emitter sensor installed near where the pump hose attaches.

The station has multiple Wi-Fi hotspots deployed around the fuel pumps such that there are no Wi-Fi dead spots. The Wi-Fi hotspots are dedicated to the fueling authorization system. They are configured to accept connections from devices that are running an application that allows them to connect and communicate with the fuel authorization system.

The station has a fuel authorization system that allows the near real time communication between the user/vehicle and a fuel card company or some other system that can authorize fuel sales.

The vehicle has a proximity sensor installed on the vehicle near the fuel filler point.

The vehicle has a data bus interface device that can extract the necessary information from the vehicle's engine ECU.

The vehicle driver/operator has a mobile device that is running an application which allows it to communicate with the vehicle data bus interface (typically via Bluetooth) and the stations dedicated fuel authorization Wi-Fi hotspots.

Process:

Vehicle pulls up to a fuel pump and positions the vehicle in front of the fuel pump such that the vehicle proximity sensor detects the pump proximity transmitter.

The proximity sensors exchange ID information (or at a minimum, the fuel pump sends a Pump ID to the vehicle over the proximity data link).

The vehicle proximity sensor sends the ID of the pump proximity sensor to the vehicle data bus interface.

The user accesses the mobile device application used for authorizing fuel.

The mobile fuel authorization application connects to the dedicated fuel authorization Wi-Fi network.

The mobile fuel authorization application gathers user information, extracts the pump proximity sensor ID and the vehicle information from the vehicle data bus interface, the vehicle's GPS location, and sends that data over the dedicated fuel authorization Wi-Fi network to the fuel authorization company (such as a fuel card company).

The fuel card company determines the user and vehicle are valid and their GPS location matches the known location of the fuel pump/station.

The fuel card company approves the sale of fuel on the given pump.

The driver/operator pumps fuel.

The vehicle leaves.

When the vehicle leaves the proximity sensor on the pump detects the vehicle has departed and notifies the fuel pump controller.

If the fuel pump has not been turned off by the driver/operator, the fuel pump controller turns off the fuel pump (thwarting fuel being pumped into a second vehicle).

Fuel Station/Terminal Using Public Wi-Fi or Cellular Technology

Components:

Each pump has a proximity transmitting sensor installed near where the pump hose attaches.

The station may have public Wi-Fi available and/or has good cell phone coverage.

The station has a fuel authorization system that allows the near real time communication between the user/vehicle and a fuel card company or some other system that can authorize fuel sales.

The vehicle has a proximity receiving sensor installed on the vehicle near the fuel filler point.

The vehicle has a data bus interface device that can extract the necessary information from the vehicle's engine ECU.

The vehicle driver/operator has a mobile device that is running an application which allows it to communicate with the vehicle data bus interface (typically via Bluetooth) and the stations dedicated fuel authorization Wi-Fi hotspots.

Process

Vehicle pulls up to a fuel pump and positions the vehicle in front of the fuel pump such that the pump proximity sensor and the vehicle proximity sensor detect each other.

The proximity sensors exchange ID information.

The vehicle proximity sensor sends the ID of the pump proximity sensor to the vehicle data bus interface.

The user accesses the mobile device application used for authorizing fuel.

The mobile fuel authorization application connects to the fuel authorization company over the public Wi-Fi network or through the cellular phone network.

The mobile fuel authorization application gathers user information, extracts the pump proximity sensor ID and the vehicle information from the vehicle data bus interface, the vehicle's GPS location, and sends that data over the existing connection to the fuel authorization company (such as a fuel card company).

The fuel card company determines the user and vehicle are valid and their GPS location matches the known location of the fuel pump/station.

The fuel card company approves the sale of fuel on the given pump.

The driver/operator pumps fuel.

The vehicle leaves.

When the vehicle leaves the proximity sensor on the pump detects the vehicle has departed and notifies the fuel pump controller.

If the fuel pump has not been turned off by the driver/operator, the fuel pump controller turns off the fuel pump (thwarting fuel being pumped into a second vehicle).

In a related embodiment, the pump sensor is logically coupled to a fuel authorization controller via some other data link than Wi-Fi (in at least one embodiment, a physical data link). The pump sensor interacts with a vehicle proximity sensor, and the VIN from the vehicle data bus/vehicle ECU is sent from the vehicle via a wireless RF data link to the pump sensor (note in such an embodiment the pump sensor and vehicle proximity sensor are equipped with an RF or IR data link). The pump sensor communicates with a fuel authorization controller, sending the fuel authorization controller the VIN uniquely identifying the vehicle. The fuel authorization controller checks to see whether the VIN is approved (much like the way in which conventional fuel authorization controllers determine if credit cards are approved), and the fuel authorization controller either approves or denies the transaction. Note that the pump sensor alerts the fuel authorization controller when the pump sensor no longer detects the vehicle proximity sensor, so no fuel will be dispensed after the vehicle moves away from the fuel pump.

Figure 1B:
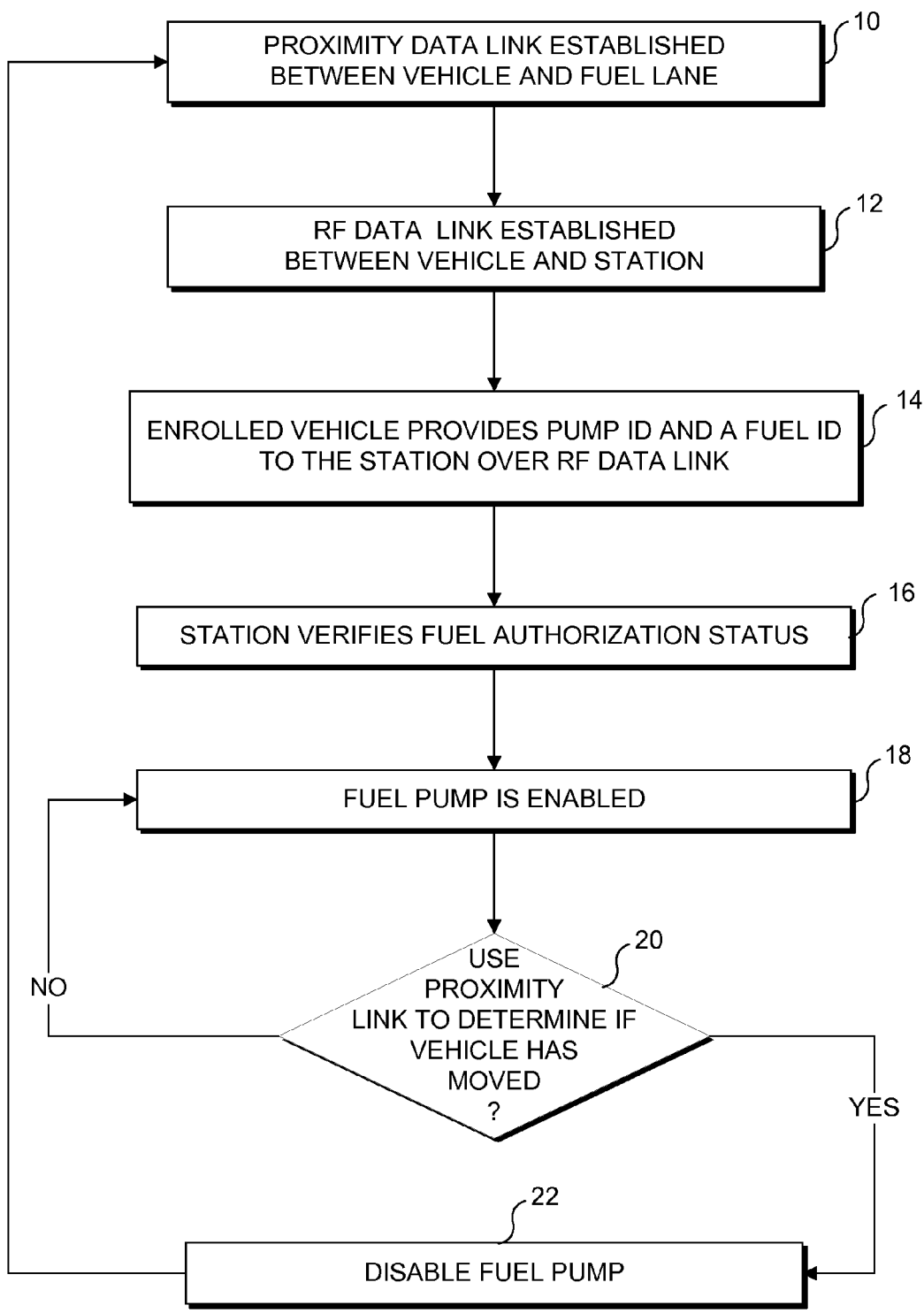

FIG. 1B is a logic diagram showing exemplary overall method steps implemented in a first exemplary embodiment for implementing a fuel authorization method. Note the method of FIG. 1B is consistent with the fuel authorization paradigm described in the Summary of the Invention in which a short range transmitter (a Proximity Transmitter) is disposed on the fuel pump (or on the fuel island near a fuel pump) and broadcasts a Pump ID. Each enrolled vehicle will be equipped with a corresponding short range receiver (a Proximity Receiver) mounted proximate the vehicle fuel tank, so that when the vehicle is positioned close enough to the fuel pump to receive fuel, the Proximity Receiver can acquire the Pump ID from the Proximity Transmitter. Once the Proximity Receiver obtains a Pump ID, the Proximity Receiver communicates the Pump ID to a Fuel Authorization Controller at the vehicle. The Fuel Authorization Controller uses a wireless data link (Wi-Fi in an exemplary but not limiting embodiment) to send a Fuel ID and the Pump ID to a Station Controller. The Station Controller checks the Fuel ID to determine if the fuel delivery is authorized. If so, the Station Controller enables fuel delivery at the fuel pump corresponding to the Pump ID.

Referring to FIG. 1B, in a block 10, a proximity data link is established between a specific fuel pump and a vehicle when the vehicle moves into an empty fuel lane (i.e., a vehicle moves close enough to a fuel pump that a Pump ID broadcast from a Proximity Transmitter at the fuel lane is detected by a Proximity Receiver at the vehicle. In a block 12, an RF data link is established between the vehicle and the refueling station (between a Fuel Authorization Controller at the vehicle and a Station Controller). In a block 14 the enrolled vehicle provides the Pump ID and a unique Fuel ID to the station over the RF data link (not the proximity data link used to broadcast the Pump ID). In a block 16 the station checks the Fuel ID to determine if the fuel delivery is authorized. If so, the station enables fuel delivery at the fuel pump corresponding to the Pump ID in a block 18.

In at least some embodiments encompassed herein, the RF data link is encrypted, such that the data transferred cannot be read without the proper key. Password exchange between the vehicle and the fuel vendor RF components can also be used to prevent RF data links from being established with non-authorized vehicles. The term "fuel vendor" as used in this context should be understood to refer to the entity operating the fuel dispensers, as opposed to a specific location. In at least some embodiments disclosed herein, the fuel vendor employs a single RF component to support fuel authorization transactions across multiple fuel dispensers/fuel lanes at a fuel depot or refueling facility, while in other embodiments disclosed herein each fuel dispenser/fuel lane participating in the refueling authorization program at a fuel depot is equipped with a dedicated RF component, which in some exemplary embodiments, is a very low powered, short range component, to reduce crosstalk and signal confusion across multiple fuel islands. In a particularly preferred embodiment, the RF data link is implemented using Wi-Fi.

In block 14, the vehicle uses the RF data link to convey verification data (Pump ID and Fuel ID) to the fuel vendor, along with any additional data that are desired. Exemplary, but not limiting types of additional data (i.e., data beyond that specifically required to enable verification for fuel delivery authorization) include fuel use related data (vehicle mileage, engine hours, fuel tank level, idle time data, etc.), operational data (such as fault codes), and driver specific data (driver ID, driver hours for DOT compliance and/or payroll). Any data collected by the vehicle can be transferred over the RF data link. Data not required by the fuel vendor can be conveyed to other parties, generally as discussed below.

It should be recognized that the step of block 16 may include multiple components. For example, in at least some of the embodiments disclosed herein, an offsite database may be queried before enabling fuel delivery (much as occurs in the approval of a credit card transaction), and in at least some other embodiments disclosed herein, the verification data are passed to a fuel pump controller that handles all fuel dispenser enablement functions (regardless of whether payment is via a credit card or the fuel authorization program).

In a block 20, the proximity link between the fuel pump/fuel island and the vehicle is used to determine if the vehicle has moved away from the fuel lane. This can be implemented by having the vehicle continually rebroadcast the Pump ID over the RF data link with the station (i.e., the data link between the Fuel Authorization Controller at the vehicle and the Station Controller, generally as discussed above in the Summary of the Invention), such that when the Pump ID is no longer included in the RF transmission between the Fuel Authorization Controller at the vehicle and the Station Controller, the fuel pump is disabled, as shown in a block 22. The termination of the proximity link between the fuel pump/fuel island and the vehicle (i.e., between the Proximity Transmitter at the fuel lane and the Proximity Receiver at the vehicle) indicates the vehicle has moved out of the fuel lane, away from the fuel pump. In a related embodiment, a motion sensor is used to detect the vehicle moving away from the fuel lane, away from the fuel pump, and a signal from the motion sensor is used to disable the fuel pump after authorization. Note that so long as the proximity data link is active, or no signal from a motion sensor indicates the vehicle has moved away from the pump, the log of decision block 20 loops back to block 18 and the fuel dispenser remains enabled.

Figure 2:
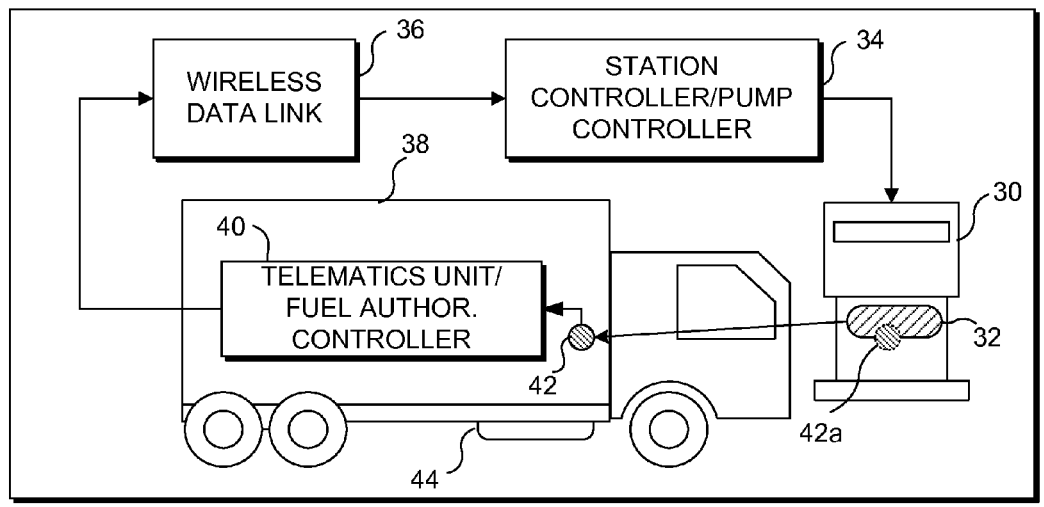

FIG. 2 schematically illustrates vehicle components and fuel island components used to implement the method steps of FIG. 1. FIG. 2 depicts a single vehicle entering a single fuel lane (i.e., approaching a single fuel pump). It should be understood that the concepts disclosed herein encompass embodiments including a plurality of different vehicles and different fuel lanes/fuel pumps. A fuel pump 30 is equipped with a short range transmitter 32 (a Proximity Transmitter), which broadcasts a Pump ID (continuously or in response to a trigger event). An enrolled vehicle 38 will be equipped with a corresponding short range receiver 42 (a Proximity Receiver) mounted proximate a vehicle fuel tank 44, so that when the vehicle is positioned close enough to the fuel pump to receive fuel, the Proximity Receiver can acquire the Pump ID from the Proximity Transmitter.

Please note that the Figure shows receiver 42 on a passenger side of the vehicle (i.e., a right front side), whereas the fuel pump is on the driver side of the vehicle (i.e., a left side of the vehicle), such that according to the Figure the mass of the vehicle is in between the Proximity Transmitter and the Proximity Receiver. The Figure shows that orientation only so the relative position of the receiver is not blocked (i.e., so an exemplary location of the receiver and fuel tank) by the mass of the vehicle. In practice, the Proximity Transmitter and the Proximity Receiver should be disposed in a facing relationship with only an air gap between them to facilitate fuel authorization. In at least some embodiments, if the mass of the vehicle is disposed in between the Proximity Transmitter and the Proximity Receiver, the short range data link between the Proximity Transmitter and the Proximity Receiver cannot be supported, and fuel authorization according to the concepts disclosed herein will not be effective.

Note also that in FIG. 2, that vehicle 38 is not yet properly positioned relative to pump 30 such that the Proximity Transmitter and the Proximity Receiver are disposed in a facing relationship (assuming the receiver were mounted in the same relative location on the driver side/left hand side of the vehicle). In at least some embodiments, the short range data link between the Proximity Transmitter and the Proximity Receiver will not be supported until the vehicle moves closer to the pump, such that the Proximity Receiver is adjacent to the Proximity Transmitter (transmitter 32), generally as indicated by a receiver 42a.

Vehicle 38 is further equipped with a fuel authorization controller 40, which is logically coupled to receiver 42. In general the logical connection will be physical, but wireless connections can be implemented if desired. In at least some embodiments, fuel authorization controller 40 is implemented using a telematics device including a position sensing component and a wireless data link component. If the component implementing fuel authorization controller 40 does not include a wireless data link component, then fuel authorization controller 40 will need to be logically coupled to a wireless data link so that fuel authorization controller 40 can provide the Pump ID obtained over the short range data link (Proximity Transmitter to the Proximity Receiver) to a station controller 34 via station wireless data link 36. In an exemplary but not limiting embodiment station wireless data link 36 is a Wi-Fi network. In another exemplary but not limiting embodiment station wireless data link 36 is a short range radio network (but longer ranged than the proximity connection between the Proximity Transmitter and the Proximity Receiver. Significantly, vehicle fuel authorization controller 40 adds additional fuel authorization credentials (the Fuel ID) to the Pump ID, so that the authorization process executed by station controller 34 involves more than simply determining which fuel pump to enable. In yet another exemplary but not limiting embodiment station wireless data link 36 is a cellular phone network.

In at least one exemplary embodiment, vehicle fuel authorization controller 40 includes a vehicle ID (an exemplary vehicle ID including a VIN) from a non-removable vehicle memory. In such an embodiment, the fuel authorization paradigm is designed so that the Fuel ID (including the VIN) is not simply stored in a removable computing device (such as the telematics device of FIG. 3, discussed below), but rather in a memory that is inconvenient to remove from the vehicle. In that manner, simply moving such a removable computing device to a non-authorized vehicle will not enable the non-authorized vehicle to obtain fuel. That will make it more difficult for someone to spoof the system by purchasing a relatively inexpensive Proximity Receiver, adding that Proximity Receiver to a non-authorized vehicle, and then moving a device including the vehicle fuel authorization controller 40 to the non-authorized vehicle. Requiring the vehicle fuel authorization controller 40 to obtain the VIN from a non-removable memory in the vehicle makes the fuel authorization system more secure.

In at least one additional exemplary embodiment, vehicle fuel authorization controller 40 prompts a driver to input a driver PIN (which comprises the Fuel ID) into a data input device logically coupled to the vehicle fuel authorization controller 40, so vehicle fuel authorization controller 40 adds the driver PIN to the Pump ID before sending that combined data to the station controller over the wireless data ink as discussed above. The driver PIN version is somewhat less secure than the VIN version noted above, as the PIN version could be spoofed if a relatively inexpensive Proximity Receiver was added to a non-authorized vehicle, and the device including the vehicle fuel authorization controller 40 was moved to the non-authorized vehicle, and the driver input his PIN while the vehicle fuel authorization controller 40 was in the non-authorized vehicle. Even though subject to some spoofing risk, this version is still more secure than simply giving a driver a fuel card. If the proximity data link between the Proximity Transmitter and the Proximity Receiver is encrypted, then to properly spoof the PIN version the person trying to spoof the system not only needs to acquire a compatible Proximity Receiver, but the encryption protocol as well.

Referring once again to station controller 34, once the Station Controller has obtained a fuel authorization request including the Fuel ID (VIN or PIN version) and a PUMP ID, the Station Controller reviews a local databases or queries a remote data base to determine if the Fuel ID is currently approved. If so, the Station Controller enables fuel delivery at fuel pump 30. Note that the station controller can be implemented by a single computing device or networked devices. The station controller can include, or be logically coupled to, a pump controller system that also manages credit and debit transactions.

Figure 3:
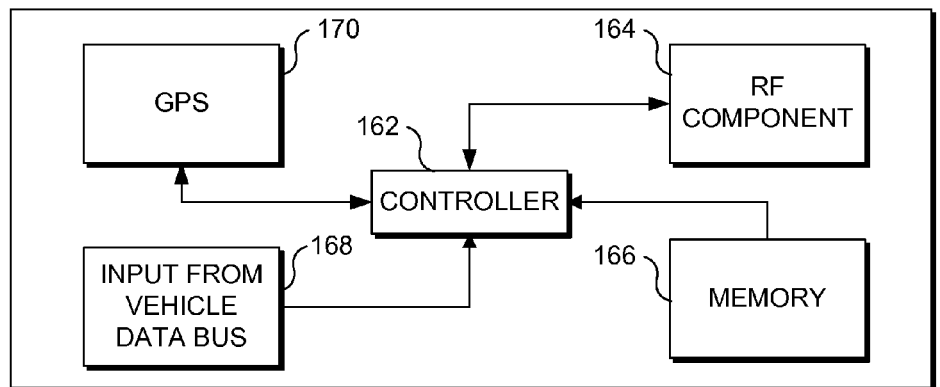
FIG. 3 is a functional block diagram of an exemplary telematics device added to an enrolled vehicle to implement some of the method steps of FIG. 1.

FIG. 3 is a functional block diagram of an exemplary telematics device added to an enrolled vehicle to implement some of the method steps of FIG. 1B. An exemplary telematics unit 160 includes a controller 162, a wireless data link component 164, a memory 166 in which data and machine instructions used by controller 162 are stored (again, it will be understood that a hardware rather than software-based controller can be implemented, if desired), a position sensing component 170 (such as a GPS receiver), and a data input component 168 configured to extract vehicle data from the vehicle's data bus and/or the vehicle's onboard controller. Other telematics devices can be employed, so long as the telematics device can acquire the Pump ID from the Proximity Receiver when the vehicle is in range of the Pump Transmitter.

The benefit of the telematics unit based embodiments of FIG. 3 is that more and more fleet vehicles employ telematics units with wireless data transfer capability, so that many of the components used for this embodiment have already received market acceptance. Of course, the telematics unit needs to include, or be logically coupled to, a wireless data link component compatible with that employed by the refueling station (i.e., wireless data link 36 of FIG. 2).

Referring to FIG. 3, telematics unit 160 has capabilities exceeding those required for participating in a fuel authorization program. The additional capabilities of telematics unit 160 are particularly useful to fleet operators. Telematics unit 160 is configured to collect position data from the vehicle (to enable vehicle owners to track the current location of their vehicles, and where they have been) and to collect vehicle operational data (including but not limited to engine temperature, coolant temperature, engine speed, vehicle speed, brake use, idle time, and fault codes), and to use the RF component to wirelessly convey such data to vehicle owners. These data transmissions can occur at regular intervals, in response to a request for data, or in real-time, or be initiated based on parameters related to the vehicle's speed and/or change in location. The term "real-time" as used herein is not intended to imply the data are transmitted instantaneously, since the data may instead be collected over a relatively short period of time (e.g., over a period of seconds or minutes), and transmitted to the remote computing device on an ongoing or intermittent basis, as opposed to storing the data at the vehicle for an extended period of time (hour or days), and transmitting an extended data set to the remote computing device after the data set has been collected. Data collected by telematics unit 160 can be conveyed to the vehicle owner using RF component 164.

In at least one embodiment, encryption keys or passwords required by the fuel authorization program are stored in memory 166, and are accessed during one or more of the fuel authorization methods discussed above. To prevent parties from stealing telematics unit 160 and installing the unit on a non-authorized vehicle and attempting to use the stolen telematics unit to acquire fuel from the fuel authorization program, in at least one exemplary embodiment, the passwords/encryption keys required for authorized refueling are changed from time-to-time. Thus, the stolen telematics unit can only be used to access the fuel authorization program for a limited time. Note that an even more secure system can be achieved by storing the encryption keys or passwords not in memory 166, but in some other memory that is not easily removed from the vehicle, such that moving telematics unit 160 from the enrolled vehicle to a non-authorized vehicle will not enable the non-authorized vehicle to participate in the fuel authorization program, because the required passwords/encryption keys are not available in the non-authorized vehicle. In at least one further embodiment, the telematics unit is configured to acquire the VIN or other ID number needed to participate in the fuel authorization program from a memory in the vehicle that is not part of the telematics unit. In such an embodiment, if a telematics unit is stolen and installed on a vehicle not enrolled in the fuel authorization program, when the stolen telematics unit acquires the new vehicle's VIN as part of the fuel authorization methods discussed above, that vehicle would not be allowed to refuel under the authorization program, because the new vehicle's VIN would not be recognized as corresponding to an enrolled vehicle. In at least one embodiment, each telematics unit has a unique serial number, and the fuel authorization program can check the vehicle ID number and the telematics ID number to determine if they are matched in the database before enabling fuel to be acquired under the fuel authorization program, to prevent stolen telematics units, or telematics units moved without authorization, to be used to acquire fuel.

In a similar embodiment, telematics unit 160 is configured to receive updated passwords/encryption keys via RF component 164, but such passwords/keys are not stored in the telematics unit (or a separate memory in the vehicle) unless the telematics unit acquires a VIN or ID number (from a memory on the vehicle that is not part of the telematics unit) that matches an ID conveyed along with the updated encryption key/password. This approach prevents stolen telematics units from acquiring updated passwords or encryption keys.

Figure 4:
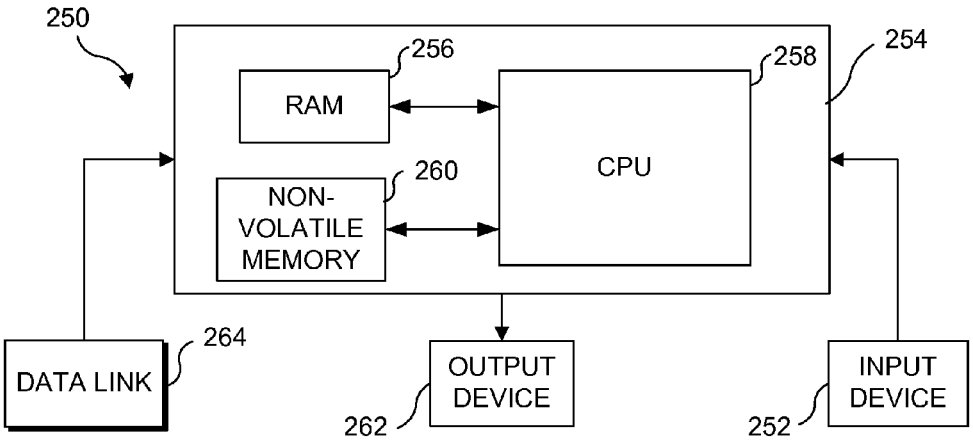
FIG. 4 is a functional block diagram of an exemplary computing device that can be employed to implement some of the method steps disclosed herein.

Steps in the methods disclosed herein can be implemented by a processor (such as a computing device implementing machine instructions to implement the specific functions noted above) or a custom circuit (such as an application specific integrated circuit). FIG. 4 schematically illustrates an exemplary computing system 250 suitable for use in implementing certain steps in the methods of FIGS. 1B, 5, and 7 (i.e., for executing one or more of blocks 14, 16, 20, and 22, of FIG. 1B, one or more of blocks 10a, 12a, 14a, 16a, 18a, and 20a of FIG. 5, one or more of blocks 10b, 12b, 14b, 16b, 18b, 20b, 22b, 24b, and 26b of FIG. 7). It should be recognized that different ones of the method steps disclosed herein can be implemented by different processors (i.e., implementation of different ones of the method steps can be distributed among a plurality of different processors, different types of processors, and processors disposed in different locations). Exemplary computing system 250 includes a processing unit 254 that is functionally coupled to an input device 252 and to an output device 262, e.g., a display (which can be used to output a result to a user, although such a result can also be stored for later review or analysis). Processing unit 254 comprises, for example, a central processing unit (CPU) 258 that executes machine instructions for carrying out at least some of the various method steps disclosed herein, such as establishing, processing, or responding to RF or IR signals. The machine instructions implement functions generally consistent with those described above (and can also be used to implement method steps in exemplary methods disclosed hereafter). CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well known in the art. Machine instructions and data are temporarily loaded into RAM 256 from non-volatile memory 260. Also stored in the non-volatile memory may be an operating system software and other software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device might be used to initially configure computing system 250, to achieve the desired processing (i.e., to combine a Fuel ID with a Pump ID, or to determine if a particular Fuel ID is valid). Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. Output device 262 generally includes any device that produces output information, but will typically comprise a monitor or display designed for human visual perception of output. Use of a conventional computer keyboard for input device 252 and a computer monitor for output device 262 should be considered as exemplary, rather than as limiting on the scope of this system. Data link 264 is configured to enable data collected in connection with operation of a fuel authorization program to be input into computing system 250. Those of ordinary skill in the art will readily recognize that many types of data links can be implemented, including, but not limited to, universal serial bus (USB) ports, parallel ports, serial ports, inputs configured to couple with portable memory storage devices, FireWire ports, infrared data ports, wireless data communication such as Wi-Fi and Bluetooth™, network connections via Ethernet ports, and other connections that employ the Internet. Note that data from the enrolled vehicles will typically be communicated wirelessly (although it is contemplated that in some cases, data may alternatively be downloaded via a wire connection).

It should be understood that the term "computer" and the term "computing device" are intended to encompass networked computers, including servers and client device, coupled in private local or wide area networks, or communicating over the Internet or other such network. The data required to implement fuel authorization transactions can be stored by one element in such a network, retrieved for review by another element in the network, and analyzed by any of the same or yet another element in the network. Again, while implementation of the method noted above has been discussed in terms of execution of machine instructions by a processor (i.e., the computing device implementing machine instructions to carry out the specific functions noted above), at least some of the method steps disclosed herein could also be implemented using a custom circuit (such as an application specific integrated circuit).

FIG. 5 is a logic diagram showing exemplary overall method steps implemented in a second exemplary embodiment for implementing a fuel authorization method, in which the fuel pump, instead of continuously broadcasting the Pump ID, only broadcasts the Pump ID when a sensor near the fuel pump indicates a vehicle is approaching or is proximate the fuel pump.

Referring to FIG. 5, in a block 10a, a fuel pump processor 10a at the fuel pump (or disposed remotely from the fuel pump, but logically coupled to a sensor by the pump and a proximity transmitter at the pump) determines whether data from a sensor by the pump has detected a vehicle. Exemplary sensors include weight sensors, and motion sensors. Some motion sensors detect changes in temperature; while other motion sensors are based on detecting a change in a distance between the sensor and a reflective surface (ultrasonic sensors can be used for this function). The latter type of motion sensors are sometimes referred to as range finders.

Once a sensor detects a vehicle near the fuel pump, the Proximity Transmitter at the pump is activated to broadcast the Pump ID in a block 12a, generally as discussed above. Note that the Proximity Transmitter is intended to establish a proximity data link (i.e., a relatively short range data link, sufficient to couple to a corresponding Proximity Receiver at a vehicle positioned to receive fuel from that fuel pump, but not with other Proximity Receivers at vehicles positioned to receive fuel other fuel pump.

In a block 14a, an RF data link is established between the vehicle and the refueling station (i.e., between a Fuel Authorization Controller at the vehicle and a Station Controller). The Fuel Authorization Controller at the vehicle combines the vehicle VIN (and any other info needed to define a Fuel ID) and the Pump ID, and sends that data to the Station Controller over the RF data link. In at least some embodiments, the Fuel Authorization Controller acquires the VIN from a vehicle databus, rather than from a memory component that is relatively easy to remove from the vehicle. In a block 16a the Station Controller checks the Fuel ID to determine if the fuel delivery is authorized. If so, the Station Controller (i.e., the Fuel Station Processor of FIG. 5) sends an authorization command (including the Pump ID) to a fuel pump controller in a block 18a. In a block 20a, the fuel pump controller enables fuel delivery at the fuel pump identified in the Pump ID.

In at least some embodiments encompassed herein, the RF data link of block 14a is encrypted, such that the data transferred cannot be read without the proper key. Password exchange between the vehicle and the fuel vendor RF components can also be used to prevent RF data links from being established with non-authorized vehicles. The term "fuel vendor" as used in this context should be understood to refer to the entity operating the fuel dispensers, as opposed to a specific location. In at least some embodiments disclosed herein, the fuel vendor employs a single RF component to support fuel authorization transactions across multiple fuel dispensers/fuel lanes at a fuel depot or refueling facility, while in other embodiments disclosed herein each fuel dispenser/fuel lane participating in the refueling authorization program at a fuel depot is equipped with a dedicated RF component, which in some exemplary embodiments, is a very low powered, short range component, to reduce crosstalk and signal confusion across multiple fuel islands. In a particularly preferred embodiment, the RF data link is implemented using Wi-Fi.

In some embodiments, additional data is communicated between the vehicle and station in block 14a, via the RF data link. Exemplary, but not limiting types of additional data (i.e., data beyond that specifically required to enable verification for fuel delivery authorization) include fuel use related data (vehicle mileage, engine hours, fuel tank level, idle time data, etc.), operational data (such as fault codes), and driver specific data (driver ID, driver hours for DOT compliance and/or payroll). Any data collected by the vehicle can be transferred over the RF data link. Data not required by the fuel vendor can be conveyed to other parties.

FIG. 6 schematically illustrates vehicle components and fuel island components used to implement the method steps of FIG. 5. A fuel island participating in the fuel authorization program may include a canopy 90 (or other support) to which a motion detector 88 is coupled, as well as a fuel pump 75 (the fuel dispenser) upon which a proximity transmitter 86 is disposed. Not specifically shown are the station RF data link or the station processor components (but those elements are shown in FIG. 2, reference numerals 36 and 34, respectively). It should be recognized that the canopy is not required, and the motion sensor could be disposed in a different location, so long as vehicle motion proximate the fuel dispenser can be detected. As enrolled vehicle 74 enters the fuel lane, motion detector 88 detects the vehicle. The Pump ID is then broadcast across a proximity data link by proximity transmitter 86, generally as discussed above. The pump ID is received by a proximity receiver 84, when the vehicle is positioned to receive fuel and the proximity transmitter and proximity receiver are generally aligned and disposed in a facing relationship to enable the proximity data link. It should be recognized that the relative locations of the proximity transmitter and proximity receiver shown in FIG. 6 are exemplary, and not limiting. All that is required is that the proximity transmitter and proximity receiver be sufficiently close to another, and properly positioned to establish the proximity data link when the vehicle is properly positioned to receive fuel.

Some types of motion detectors function by sending out an ultrasonic pulse, and receiving a reflected pulse, to determine a distance between the sensor and the reflective surface. In FIG. 6, a distance 85a represents a distance that will be detected by the sensor when no vehicle is present and the signal from the sensor is being reflected by the ground under the canopy. A distance 85b represents a distance that will be detected by the sensor when a vehicle is present and the signal from the sensor is being reflected by the cab of the vehicle. The sensor will generally be able to distinguish between distances 85a and 85b, for a variety of different vehicle sizes. In various embodiments, the fuel island processor can use data from the motion sensor to control the fuel authorization process. In one exemplary embodiment, the fuel island controller is configured to ignore fuel authorization requests if the motion sensor reports a distance that does not meet a predefined minimum (this would prevent fuel authorizations for smaller vehicles, such as cars, that might have been equipped with components to attempt to spoof the fuel authorization system). In another exemplary embodiment, the fuel island controller is configured to keep the pump enabled so long as the motion sensor reports a distance that ranges between a predefined minimum and a predefined maximum, which generally correspond with the dimensions of vehicles enrolled in the fuel authorization program (such as commercial trucks, including but not limited to tractor/trailer combinations). This enables drivers to move their vehicle relative to the fuel island after the proximity data link has been established, to make sure the vehicle's fuel tanks are properly positioned relative to the fuel dispenser (which may not always be the case when the proximity receiver and transmitter are aligned, depending on the relative position and number of the vehicle's fuel tanks).

In another exemplary embodiment, distance 85a is generally about 200 inches, and the fuel island controller is configured to assume that any reading between about 174 inches and about 200 inches indicates that the fuel lane is empty. Reefers (refrigerated trailers) generally are about 162 inches or taller. Non-refrigerated trailers and tractor cabs are generally less than about 162 inches in height. Based on those distances, in a related exemplary embodiment the fuel island controller (or a non-local controller analyzing data from the range finder/motion sensor at the fuel island) is configured to assume that when distance 85b ranges from about 0 to less than about 38 inches, that a reefer trailer is underneath the sensor (the sensor is 200 inches from the ground, and a reefer trailer is greater than about 162 inches in height). Similarly, the fuel island controller is configured to assume that when distance 85b ranges from about 39 inches to about 173 inches a non-reefer trailer or cab (or some other type of vehicle) is underneath the sensor. Thus, the processor can be configured to determine when a reefer trailer is positioned beneath the sensor. The controller can then be configured to assume that fuel delivered when a reefer trailer is positioned below the sensor is fuel to be used for the reefer trailer, and not for the power unit (i.e., for the tractor pulling the trailer). In at least one embodiment, the fuel island controller is configured to apportion fuel as follows. When the distance between the sensor ranges from about 39 inches to about 173 inches, and fuel delivery is enabled, that fuel is allocated to over the road use. If the sensor detects that the vehicle being fueled is repositioned, and the distance between the sensor and the vehicle now ranges from about 0 inches to less than about 38 inches (i.e., the sensor detects that the distance between the sensor and the vehicle has decreased), then any fuel delivered subsequently is assumed to be fuel for a reefer trailer, and not for over the road use (thus, the second portion of fuel can be taxed at a different rate). The decrease in distance between the sensor and the vehicle is because the fuel tanks for the over the road use are part of the power unit (i.e., the tractor), while the fuel tanks for a reefer are near a midpoint or rear of the reefer trailer, thus the vehicle needs to be moved to allow the fuel dispenser to reach the reefer fuel tanks.

In one or more of the embodiments disclosed herein, the fuel island processor (whether actually located at the fuel island or elsewhere) can be configured so that the fuel dispenser is disabled whenever the sensor detects distance 85a, indicating that the vehicle has exited the fuel lane (see FIG. 7, step 24b).

FIG. 7 is a logic diagram showing exemplary overall method steps implemented in a third exemplary embodiment for implementing a fuel authorization method. Referring to FIG. 7, in a block 10b, a Proximity Transmitter at a fuel pump broadcasts a wake up signal, either continuously (whenever the pump is available for fueling) or in response to a trigger event. The function of the wake up signal is to "wake up" a fuel authorization processor in an enrolled vehicle, so the fuel authorization processor in the enrolled vehicle sends a fuel authorization request over wireless data link to a fuel station authorization processor that can authorize fueling. In this fuel authorization paradigm, the fuel authorization processor in an enrolled vehicle will only broadcast a fuel authorization request after receiving a wake up signal. The wake up signal includes a Pump ID that can be used to specifically identify the particular pump emitting that wake up signal (i.e., the wake up signal from each pump is unique).

In various exemplary embodiments the wake up signal is only transmitted from the fuel pump after a trigger event. In at least one exemplary embodiment, the trigger event is the detection of a vehicle near the fuel pump by a sensor. The sensor can include one or more of a motion sensor and a pressure sensor (which detects the weight of the vehicle, the pressure sensor being disposed in the ground near the fuel pump).

In at least one exemplary embodiment, the trigger event is the detection of an enrolled vehicle approaching the refueling station. Such detection can be achieved in many different ways. For example, the vehicle can include a position sensing component that regularly reports its position to a remote server. That remote server can be coupled in logical communication, via one or more networks, with a fuel station authorization processor. As an enrolled vehicle approaches the fuel station, the fuel station authorization processor can send a signal to each fuel pump to emit a wake up signal. The trigger can be configured so that the fuel pumps each emit a wake up signal when an enrolled vehicle is within 1000 feet of the fuel station, recognizing that such a distance is exemplary, rather than limiting. In general, the distance should be small enough such that the wake up signal is not triggered if the vehicle is simply passing by the fuel station along a nearby arterial or highway.

In at least one exemplary embodiment, the detection of an enrolled vehicle approaching the refueling station is achieved when a wireless data link, such as a Wi-Fi connection, is established between an enrolled vehicle and a wireless data link/wireless network operated by the fueling station. The enrolled vehicle will be equipped with a wireless network component configured to automatically log onto wireless networks operated by fueling stations participating in the fuel authorization program. Once an enrolled vehicle logs onto such a network, the fuel station authorization processor can send a signal to each fuel pump to emit a wake up signal.

Referring once again to FIG. 7, in a block 12b a wake up receiver on an enrolled vehicle receives a wake up signal emitted by a wake up signal transmitter at a fuel pump; when the enrolled vehicle is positioned close enough to that fuel pump to receive fuel.

In a block 14b the wake up signal in the vehicle sends the Pump ID in the wake up signal to a fuel authorization processor in the vehicle. In a block 16b the fuel authorization processor in the vehicle retrieves credentials that can be used to authorize a fueling transaction. Generally as discussed above, the credentials can include a VIN and/or a PIN. If the VIN is used, in exemplary but not limiting embodiments the VIN is acquired from a vehicle data bus, as opposed to a non-transitory memory in a component that can be easily removable from the vehicle (such as a removable mobile computing device). In a block 18b, the fuel authorization processor in the vehicle combines the credentials and the Pump ID into a fuel authorization request that is communicated over a wireless data link to the station fuel authorization controller. In a block 20*b* the station fuel authorization controller checks the vehicle credentials (the VIN or PIN in selected embodiments), and if the transaction is approved the pump identified by the Pump ID is enabled in a block 22*b*.

In a decision block 24*b*, the station fuel authorization controller determines if the vehicle has moved away from the pump. If the vehicle is still present, the logic loops back to block 22*b*, and the fuel pump remains enabled. If the vehicle moves away from the fuel pump, the fuel pump is disabled in a block 26*b*. The step of decision block 24*b* can be implemented in several manners (noting that combinations and permutations of the following can be implemented. The vehicle can be detected moving away from the pump using a motion sensor at the fuel pump. The vehicle can be detected moving away from the pump using a pressure sensor at the fuel pump. The vehicle can be detected moving away from the pump because a connection between the wake up transmitter at the pump and the wake up receiver at the vehicle is broken (this can be detected when the fuel authorization processor at the vehicle stops emitting the Pump ID). The vehicle can be detected moving away from the pump by a processor at the vehicle communicating movement of the vehicle to the station fuel authorization controller over the wireless data link used by the vehicle to communicate the fuel authorization credentials and the pump ID (see block 18*b*).

FIG. 8 is an exemplary functional block diagram showing the basic functional components used to implement a system consistent with one or more of the methods disclosed herein. Shown in FIG. 8 are an enrolled vehicle 40 and a refueling facility 54. Vehicle 40 includes a vehicle controller 42 implementing functions generally consistent with the vehicle functions discussed above in connection with FIGS. 1B, 5, and/or 7 (noting that if desired, such functions could be implemented using more than a single controller, such functions generally being discussed above in the context of a vehicle fuel authorization controller or a vehicle fuel authorization processor), a Proximity Receiver component 44, an RF data link component 46 (i.e., an RF transmitter and an RF receiver, implemented as a single component or a plurality of separate components), and a memory 48 in which vehicle ID data (and/or fuel authorization verification data) are stored (noting that in some exemplary embodiments, the memory in which such data are stored is not part of a required fuel authorization component, such as a telematics unit, that is added to enrolled vehicles, such that removal of the added component alone is insufficient to enable the removed component to be used in a non-authorized vehicle to participate in the fuel authorization program), each such component being logically coupled to controller 42. Vehicle 40 may also include an optional input/output device 52 that can be used to provide feedback or instructions relevant to the fuel authorization program to the vehicle operator (and/or receive an input from a driver, such as a PIN), and fuel use data generating components 50 (i.e., components that collect data that can be used to calculate an amount of fuel used by the vehicle). Each optional component is logically coupled to the vehicle controller.

Refueling facility 54 includes a fuel depot controller 56 implementing functions generally consistent with fuel vendor functions discussed above in connection with one or more of FIGS. 1B, 5 and 7 2B (noting that if desired, such functions could be implemented using more than a single controller; such functions generally being discussed above in the context of a station fuel authorization controller or a station fuel authorization processor) and an RF data link component 58 (i.e., an RF transmitter and an RF receiver, implemented as a single component or a plurality of separate components) logically coupled to controller 56. Refueling facility 54 will likely include a plurality of fuel lanes, including at least one fuel lane 59. Each fuel lane participating in the fuel authorization program includes a Proximity Transmitter component 60 disposed at the fuel pump, and if desired an option vehicle detecting sensor 64, each of which is logically coupled to controller 56. Note that controller 56 and RF component 58 of refueling facility 54 are intended to support a plurality of different fuel lanes participating in the fuel authorization program. As discussed below, the concepts disclosed herein also encompass embodiments where each participating fuel lane includes its own RF component and processor component.

To recap the functions implemented by the various components in the enrolled vehicle and the refueling facility in the exemplary fuel authorization method of FIGS. 1B, 5, and/or 7, as the enrolled vehicle enters a fuel lane participating in the fuel authorization program, sensor 64 (if equipped) detects the vehicle, and Proximity Transmitter component 60 broadcasts a Pump ID, which is detected by Proximity Receiver component 44 when an enrolled vehicle is positioned next to the pump at a location that will allow fuel delivery once the pump is enabled. The Proximity Receiver component 44 sends the Pump ID to vehicle controller 42, which adds the ID data from memory 48 to the Pump ID and that information is conveyed to fuel depot controller 56 using RF data link 46. In some embodiments, passwords or encryption keys are also stored in memory 48 and are used to confirm that the vehicle is enrolled in the fuel authorization program. Once the enrolled vehicle's status in the fuel authorization program is confirmed, fuel depot controller 56 enables the pump defined in the Pump ID provided by Proximity Transmitter component 60 (so long as sensor 64 indicates that the enrolled vehicle has not exited the fuel lane). It should be noted that if controller 56 and RF component 58 are used to support a plurality of different fuel islands participating in the fuel authorization program, then RF component 58 will need to have sufficient range, power, and bandwidth to support simultaneous operations with a plurality of fuel islands. In some embodiments, RF Component 58 is a Wi-Fi network.

As noted above, in at least some embodiments, controller 42 also uses the RF data link between the vehicle and the refueling facility to transfer data other than that needed to verify that the enrolled vehicle is authorized to participate in the fuel authorization program. This additional data can include without any implied limitation: fault code data, vehicle performance and/or fuel efficiency and consumption data, and driver data (such as driver ID and the driver's accumulated hours for compliance and payroll). A potentially useful type of additional data will be fuel use data collected by components 50 (see FIG. 9).

FIG. 9 is a functional block diagram showing some exemplary components used to collect fuel use data, including a fuel tank level sensor 50*a* (indicating how much fuel is stored in the vehicle's fuel tanks before refueling), fuel injectors sensors 50*b* (configured to determine how much fuel has passed through the engine fuel injectors, indicating how much fuel has been consumed by the vehicle), an engine hour meter 50*c* (configured to determine how many hours the vehicle's engine has been operated, which can be used in addition to or in place of the fuel injector data to determine how much fuel the vehicle has consumed), and an odometer 50*d* (configured to determine how many miles or kilometers the vehicle has traveled, which can be used in addition to or in place of the fuel injector data (or engine hour data) to determine how much fuel the vehicle has consumed).

At least some of the concepts discussed above generally address two significant concerns. First, the fuel vendor needs to unambiguously know what fuel dispenser should be enabled for which participating vehicle. The use of RF data transmission alone between the fuel vendor and the participating vehicle is not optimal, because RF transmissions can be reflected, and it is potentially possible that relying on RF transmissions alone could result in the fuel vendor enabling a first fuel dispenser when the participating vehicle is actually proximate a second fuel dispenser. Some of the concepts discussed herein address this issue by using a proximity data link interaction between the vehicle and a specific fuel lane, so that enablement of the appropriate fuel dispenser is more certain.

A second concern is preventing non-authorized vehicles from participating in the fuel authorization program by removing a relatively easy to remove component from an enrolled vehicle, and temporarily (or permanently) installing that component on the non-authorized vehicle. Some of the concepts discussed herein address this issue by requiring the vehicle that wishes to acquire fuel to include one or more components needed for the authorization process, but such components do not themselves store all the data required for authorization. Instead, such components are configured to acquire the data (in response to a fuel vendor request for the data) from a memory in the vehicle that is not readily removable, thus deterring drivers from temporarily removing a required authorization component and loaning it to another vehicle. Other ones of the concepts discussed herein address this issue by using passwords and/or encryption keys that are regularly updated, so that a stolen vehicle component required to participate in the fuel authorization program will only be useful for a limited period of time (i.e., until the password/encryption key is changed).

Certain of the method steps described above can be implemented automatically. It should therefore be understood that the concepts disclosed herein can also be implemented by a controller, and by an automated system for implementing the steps of the method discussed above. In such a system, the basic elements include an enrolled vehicle having components required to facilitate the authorization process, and a fuel vendor whose fuel lanes/fuel dispensers include components that are required to facilitate the authorization process as discussed above. It should be recognized that these basic elements can be combined in many different configurations to achieve the exemplary concepts discussed above. Thus, the details provided herein are intended to be exemplary, and not limiting on the scope of the concepts disclosed herein.

It should be recognized that the terms processor and controller are used interchangeably herein.

It should be recognized that the methods of FIGS. 1B, 5, and 7 can be modified such that no connection to a vehicle data bus is required (or a non-removable vehicle memory). This eliminates a hurdle to spoofing the fuel authorization systems disclosed herein, but the proximity receiver is still required, and will present a barrier to making it very simple to spoof the system, as the proximity receiver needs to be compatible with the proximity transmitters, and such components are not really easily obtained by a consumer without a specific background in electronic components.

It should be recognized that in some embodiments, the proximity transmitter at the pump can actually detect the presence of the proximity receiver on the vehicle, so that the pump ID is only broadcast when a proximity receiver is detected.

In at least one embodiment, the fuel vendor detects a vehicle approaching a fuel pump when the vehicle logs onto a network (such as a Wi-Fi network) at the fuel location. The fuel vendor can then activate all of the pumps equipped with proximity sensors to begin broadcasting Pump IDs.

In at least one embodiment, the fuel pump proximity transmitter is programmed to broadcast continuously broadcast the Pump ID. The vehicle based fuel authorization processor component is then programmed to use a wireless data link to rebroadcast the Pump ID to the station fuel authorization processor component so long as the pump ID transmitted by the proximity transmitter component at the pump is received by the proximity receiver component at the vehicle. The fuel vendor can disable the fuel pump when the pump ID is no longer being rebroadcast by the vehicle (the proximity link will be broken when the vehicle moves away from the pump, and the vehicle will no longer be rebroadcasting the Pump ID at that time).

In a related embodiment the vehicle fuel authorization processor component is programmed to automatically sending a termination to the station fuel authorization processor component over the station wireless data link when the when the vehicle leaves the pump (based on detecting vehicle ignition, gear selection, a minimum RPM associated with motion, a minimum speed, a change in position data, or sdate from a vehicle data bus indicating motion). The fuel vendor can then automatically disable the fuel pump when the termination signal is received by the station fuel authorization processor component.

Non-Transitory Memory Medium

Many of the concepts disclosed herein are implemented using a processor that executes a sequence of logical steps using machine instructions stored on a physical or non-transitory memory medium. It should be understood that where the specification and claims of this document refer to a memory medium, that reference is intended to be directed to a non-transitory memory medium. Such sequences can also be implemented by physical logical electrical circuits specifically configured to implement those logical steps (such circuits encompass application specific integrated circuits).

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for administering a fuel authorization program, the method comprising the steps of:
    (a) automatically detecting a vehicle approaching a fuel station including a plurality of different fuel pumps;
    (b) automatically transmitting a fuel pump identifier (ID) from a proximity transmitter component disposed at each of the plurality of fuel pumps, such that each one of the plurality of fuel pumps transmits a unique ID, in response to detecting the approaching vehicle, such that each fuel pump ID is not continuously being broadcasted, but is only broadcast in response to detecting the approaching vehicle;

(c) receiving the fuel pump ID of the fuel pump the vehicle is adjacent to using a proximity receiver component disposed at the vehicle proximate to a fueling port for receiving fuel, the vehicle receiver proximity component being logically coupled to a vehicle based fuel authorization processor component;

(d) automatically conveying the fuel pump ID received by the proximity receiver component to the vehicle based fuel authorization processor component in response to receiving the fuel pump ID at the proximity receiver component;

(e) automatically using a station wireless data link to send the fuel pump ID and a fuel ID from the vehicle based fuel authorization processor component to a station fuel authorization processor component in response to obtaining the fuel ID at the vehicle based fuel authorization processor component; and (f) automatically using the fuel ID at the station fuel authorization processor component in response to receiving the fuel pump ID and fuel ID at the station fuel authorization processor component, to determine if the vehicle is enrolled in the fuel authorization program and is authorized to receive fuel, and if so, automatically enabling fuel delivery at the fuel pump identified by the fuel pump ID.

2. The method of claim 1, wherein the step of automatically detecting the vehicle approaching the fuel station comprises the step of automatically detecting a signal from a motion sensor proximate the fuel pump.

3. The method of claim 2, further comprising the step of automatically disabling the fuel pump when the motion sensor indicates the vehicle has moved away from the fuel pump.

4. The method of claim 2, wherein the step of automatically detecting the signal from the motion sensor proximate the fuel pump comprises the steps of:

($a_1$) installing a motion sensor above the fuel pump, the motion sensor being able to calculate a distance between the motion sensor and an object beneath the motion sensor, the motion sensor ignoring any distance that indicates that no object is between a ground surface and the motion sensor;

($a_2$) ignoring any objects detected by the motion sensor where a distance detected by the motion sensor indicates that the object does not meet a predefined size, the predefined size having been selected such that objects corresponding to passenger vehicles are ignored, whereas objects corresponding to larger commercial vehicles are detected;

($a_3$) automatically generating the signal to transmit the fuel pump ID from the proximity transmitter component when an object larger than the predefined size is detected.

5. The method of claim 1, wherein the step of automatically detecting the vehicle approaching the fuel station comprises the step of automatically detecting a signal from a pressure sensor proximate the fuel pump.

6. The method of claim 5, further comprising the step of automatically disabling the fuel pump when the pressure sensor indicates the vehicle has moved away from the fuel pump.

7. The method of claim 1, wherein the step of automatically detecting the vehicle approaching the fuel station comprises automatically detecting that a current position of the vehicle as reported by a position sensing component at the vehicle, which is then communicated over a network to the fuel station at which the fuel pump is located, corresponds to the location of the fuel station.

8. The method of claim 1, wherein the step of automatically detecting the vehicle approaching the fuel station comprises the step of detecting the proximity receiver component disposed at the vehicle using the proximity transmitter component disposed at one of the plurality of fuel pumps.

9. The method of claim 8, further comprising the step of automatically disabling the fuel pump when the proximity transmitter component can no longer detect the proximity receiver component disposed at the vehicle, indicating the vehicle has moved away from the fuel pump.

10. The method of claim 1, wherein the station wireless data link is Wi-Fi.

11. The method of claim 1, wherein the proximity receiver component and the vehicle based fuel authorization processor component communicate over a vehicle wireless data link, the vehicle wireless data link being separate and distinct from the station wireless data link.

12. The method of claim 1, further comprising the steps of:

(g) automatically obtaining a current vehicle location from a position sensing component at the vehicle, in response to receiving the pump ID at the vehicle based fuel authorization processor component, the vehicle location being required by a fuel vendor for fuel authorization;

(h) automatically using the station wireless data link to send the current vehicle location along with the pump ID from the vehicle based fuel authorization processor component to the station fuel authorization processor component in response to obtaining the current vehicle location at the vehicle based fuel authorization processor component; and (i) automatically using the current vehicle location at the station fuel authorization processor component in response to receiving the pump ID and the current vehicle location at the station fuel authorization processor component, to determine if the vehicle location generally corresponds to the location of the fuel station, and if so, automatically enabling fuel delivery at the fuel pump identified by the pump ID.

* * * * *